United States Patent [19]

Penz

[11] 4,364,039
[45] Dec. 14, 1982

[54] STACKED ELECTRO-OPTIC DISPLAY

[75] Inventor: Perry A. Penz, Richardson, Tex.

[73] Assignee: Texas Instruments Incorporated, Dallas, Tex.

[21] Appl. No.: 172,108

[22] Filed: Jul. 25, 1980

[51] Int. Cl.³ .............................................. G09G 3/36
[52] U.S. Cl. .................................... 340/784; 340/716; 350/335
[58] Field of Search ................. 340/784, 716; 350/335

[56] References Cited

U.S. PATENT DOCUMENTS

| | | | |
|---|---|---|---|
| 3,655,269 | 4/1972 | Heilmeier | 340/784 X |
| 3,661,444 | 5/1972 | Matthies | 350/335 |
| 3,873,186 | 3/1975 | Ritchie | 350/335 |
| 3,977,767 | 8/1976 | Okuma et al. | 350/335 X |
| 3,982,239 | 9/1976 | Sherr | 340/784 X |
| 3,992,082 | 11/1976 | Katz | 350/335 |
| 4,039,254 | 8/1977 | Harsch | 350/335 |
| 4,099,855 | 7/1978 | Wisbey et al. | 350/335 X |
| 4,231,640 | 11/1980 | Funada et al. | 340/716 X |
| 4,232,948 | 11/1980 | Shanks | 350/335 X |
| 4,241,339 | 12/1980 | Ushiyama | 340/784 X |

OTHER PUBLICATIONS

Alt and Pleshko, "Scanning Limitations of Liquid-Crystal Displays", IEEE Transactions on Electron Devices, vol. ED-21, No. 2, Feb. 1974, pp. 146-155.

Primary Examiner—David L. Trafton
Attorney, Agent, or Firm—Robert O. Groover, III; Melvin Sharp; James T. Comfort

[57] ABSTRACT

A visual display and method for producing the same. A plurality of electro-optic cells, such as liquid crystal cells, are placed in an optical series. Each of the cells receives approximately simultaneous identical signals. Due to the series relationship, the resulting contrast ratio will be significantly improved. The transmission function acting on the entering light will be squared after the second electro-optic cell, cubed after the third cell, etc. The enhanced transmission function has a vastly improved rise after the threshold voltage allowing for greater multiplexing capability.

4 Claims, 6 Drawing Figures

STACKED ELECTRO-OPTIC DISPLAY

BACKGROUND

This invention relates to methods and apparatus for a visual output device which uses electro-optic cells, such as liquid crystal cells. Such output devices are commonly used in calculators, watches, electronic thermometers, or the like.

With the advent of hand-held devices came the need for effective visual output means which could be powered using a lower voltage than the associated desk top devices had access to utilize. The use of an electro-optic cell, e.g., a liquid crystal cell, has been widely accepted in the industry due to its ability to be constantly visible to the user, its low cost, and its relatively low power demand. An electro-optic cell may be characterized as a device which will allow light or a patterned image to pass through the cell, depending on the electrical energy received. Commonly these cells use a liquid crystal material.

For information content higher than the 23 segments in a standard digital watch display, multiplexing the display is essential to avoid excessive chip/display interconnections. Multiplexing involves exciting one pixel and moving quickly to another operation. Given the X-Y matrix used in multiplexing, a given pixel receives exitation signals during the whole addressing cycle, not just at the time it is specifically addressed. In order for the drive technique to work, the pixel in question must not respond to the extra signals. This means that the electro-optic response, transmission function, of the device must have a threshold characteristic. The extent to which the display turns on in a multiplex drive scheme is related to the steepness or slope of the contrast ratio vs. voltage curve above threshold. The sharper this transition, the more lines which can be addressed and consequently the more data that can be presented. For many nonemissive type displays, e.g., liquid crystals, the sharpness of this transfer function is poor, leading to a limited level of multiplexing and a limited information content.

SUMMARY OF THE INVENTION

Although this application addresses liquid crystal cells, the theory and applicability may be made to all electro-optic cells, a device which will permit light or an image to pass through it in relation to the externally supplied voltage.

Note initially that the contrast ratio of a liquid crystal cell as a function of voltage, past the threshold voltage, is a nonlinear concave down function, as exemplified in L. A. Goodman's article, "Liquid Crystal Displays", Journal of Vacuum Science Technology, Vol. 10, No. 5, September/October 1973, page 804–8923 at 817. This function exemplifies the need for a disproportinate amount of voltage to achieve a given degree of darkening or opaqueing in a liquid crystal cell at a higher level of opaqueness.

A second relevant phenomena is that a device which has a transmission function T, when put in series with a similar device will result in an overall system having a transmission function of $T^2$. Hence, input of $I_{in}$ will have, after the first device, output $I_{out}=I_{in}T$; the output after the second device in series is $I_{out}=I_{in}T^2$. This relationship may be carried on ad infininum. The principle, it turns out, is applicable to the transmission function of an electro-optic cell as well. The transmission function is determinative of the contrast ratio.

The present invention involves positioning two or more independent electro-optic cells in an optical series and giving each of the cells approximately simultaneous identical signals. As the light entering the optical series passes from one cell to the next, the contrast ratio is then squared, cubed, etc., until the light exits from the last cell.

The need for approximately simultaneous signals is important for the invention. The optical series of cells must react identically; that is, identically within the ability of the observor to differentiate in time.

Obviously, there is some practical limit on the number of cells which can be put in optical series and still have a device with a discernable "off" and "on" state. This practical limit is controlled by the amount of absorption or scattering generated by the cell in its inactive or "off" stage. Every electro-optic cell diffuses some light, even in its "clear" state.

As those in the art will realize, to achieve the desired results, the electrodes which define the image areas in each liquid crystal cell must be aligned so that the display will be "crisp". As they become nonaligned, the resulting display will be fuzzy or blurred since the dark part of each cell would not lie in optical series.

Various modifications to the above invention are obvious to those in the art. Some of these modifications include using a means for reflection, such as a mirror, placed at the end of the optical series of cells to reflect the light back through the cells before exiting the system to some observer. Another variation involves interposing a polarizing means between the cells or using a polarizing sheet as part of the enclosure for the cell.

The above optical series and associated mirrors or polarizers constitute an optical channel. In practice, the construction of this optical channel requires that the distance between pixels must be much less than the pixel's width. Light entering the first pixel must effectively enter the next pixel at the same relative point to achieve the optical series requirements discussed earlier.

The invention as described is particularly applicable to multiplexing. As discussed above, the multiplex capability of a display depends on the sharpness of the transmission function. For a stacked display, the displays being optically independent, the transmission function is raised to a power depending on the number of displays in the stack. Anytime a nonlinear function is raised to a power algebraically, the sharpness of the function is increased. In this context then, sharpness is generalized when referring to the "slope" of the transmission function within a selected area. This invention allows for a much quicker rise of contrast ratio with voltage. For a more in-depth discussion on multiplexing techniques, refer to Jacques Robert and Bruno Dargent's article "Multiplexing Techniques for Liquid-Crystal Displays", IEEE Transactions on Electron Devices, Vol. Ed-24, No. 6, June 1977, Pages 694–697.

The invention, together with the beforementioned principles will be more fully explained by the following figures and their accompanying descriptions.

FIGURES IN GENERAL

FIGS. 1a and 1b illustrate the squaring relationship of two black boxes having identical transfer functions.

FIG. 2 graphically shows the advantage gained through squaring and quadrupling transfer function.

FIGURES IN DETAIL

Figure 1A:
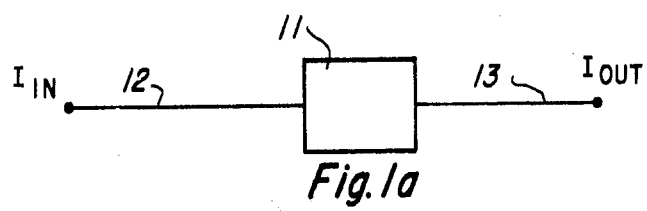
Figure 1B:
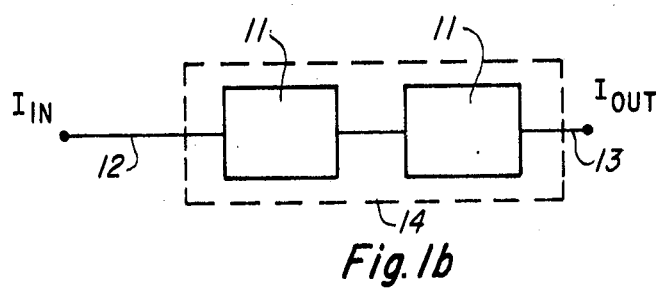

Specifically in FIG. 1a, black box 11 has a transfer function, T. That is to say, input 12, $I_{in}$, will be transformed to give an output 13, $I_{out}$, defined by the function $I_{out}=TI_{in}$. By then placing two black boxes 11 in series, as illustrated in FIG. 1b, the output will be defined in the function $I_{out}=T^2I_{in}$. These two black boxes 11 then form a system 14 which has a transformation function $T^2$. This general principle is true for an optical transfer function in series as well as electrical functions set in series.

Light entering a first independent cell will be modulated by T; similarly the second cell will modulate by T as well. As example: suppose each cell has an 80% transmission, light exiting the first cell is (0.80)L where L is the light entering the first cell. This (0.80)L enters the second cell which modulates the light again by 80% resulting in (0.80) (0.80)L=(0.80)$^2$L exiting the series.

Figure 2:
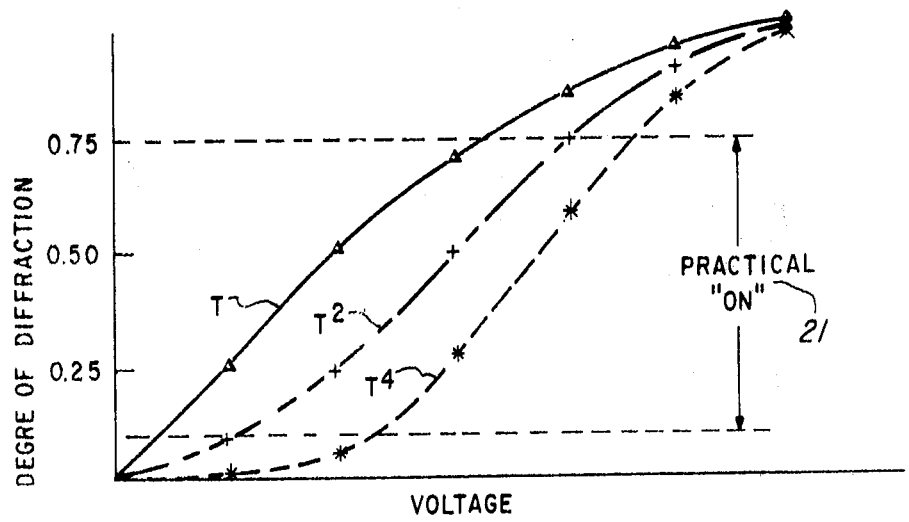

FIG. 2 graphically illustrates the advantage gained by the series relationship. A sine function is used only as illustrative of the degree of diffraction as a function of voltage. The sine function is a fair approximation to the transfer function of light past the threshold voltage.

Within the practical "On" zone 21, the function T is concave down, whereas the $T^2$ and $T^4$ functions are concave up. This means that a little increase in voltage within this zone will have more distinctive darkening for the $T^2$ or $T^4$ functions than in the T function. This change in curve structure permits added multiplexing opportunity.

Figure 3:
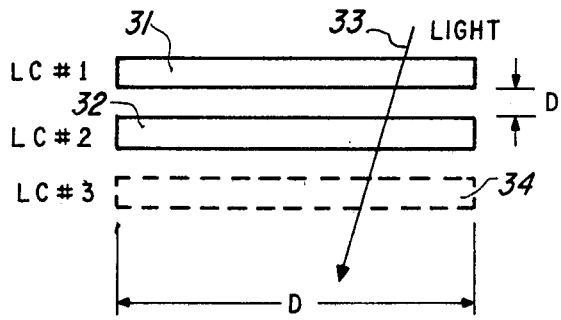
FIG. 3 is a cross section of the conceptual optical path considerations for the invention.

In FIG. 3, light ray 33 enters the top electro-optic display cell 31 and then passes through to a second electro-optic cell 32. To keep the beam of light passing through the same relative points, the pixel to pixel distance, d, must be much less than the pixel width, D. It has been determined that values of d=10 mils and D=25 mils will produce acceptable results. These two results are given only as examples of values for which the invention will work and are not to be restricting or limiting upon the invention.

The number of cells in series is discretionary and may be carried on ad infininum, as is indicated by liquid crystal cell 34, but is practically bounded by the number of cells in series which still have a practical "on" and "off" state.

Figure 4:
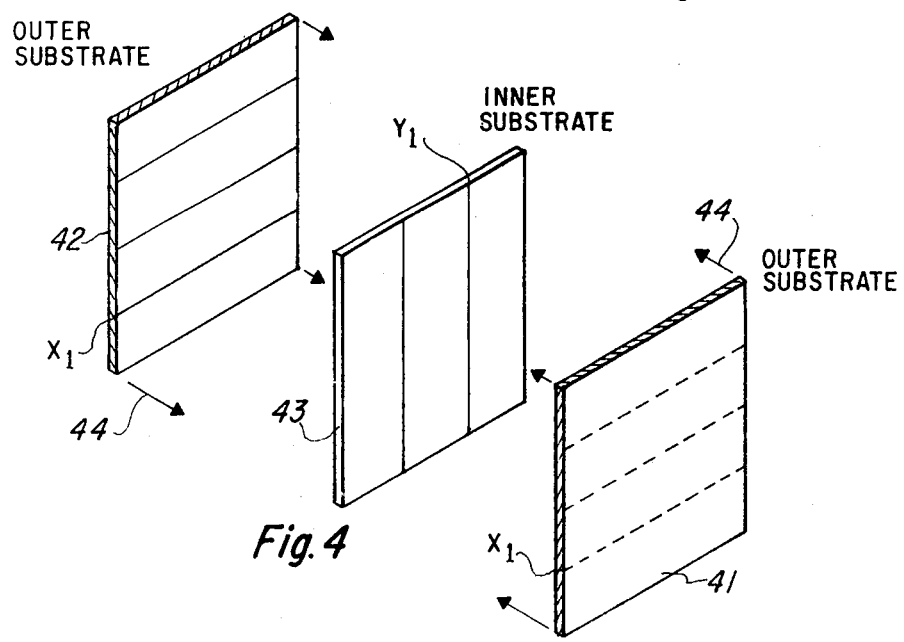
FIG. 4 is a pictorial representation of a preferred embodiment of the invention.

Intrinsic to the invention is that each of the cells in the optical channel receives approximately simultaneous identical signals. FIG. 4 illustrates the preferred embodiment of the invention which will accomplish the above tasks.

In FIG. 4, outer substrates 41 and 42 each have parallel electrodes embodied on them. These electrodes will form the "X" axis. Inner substrate 43 has embodied parallel electrodes forming the "Y" axis. The "Y" axis electrodes are on both sides of the inner substrate 43. Through cavity regions or other methods known to those in the art, a quantity of liquid crystal material is maintained between the outer substrates and the inner substrate while the three substrates are sealed to each other. The direction of sealing is indicated by arrows 44. The liquid crystal material is not illustrated in this drawing, nor is the means for sealing.

The "X" axis electrodes are then coupled to their associated mate on the other outer substrate allowing for a signal to $X_1$ on the outer substrate 41 to be approximately simultaneously communicated to $X_1$ on the outer substrate 42. Similarly, the $Y_1$ electrical lead on one surface of the inner substrate 43 is connected to the $Y_1$ electrode on the opposite surface. The $X_1$ electrodes of each outer substrate must be as close to being in registered alignment as possible to maximize the crispness of the display. Similarly the Y leads must also be in the same aligned relationship. As noted before, as the associated electrodes become nonaligned, the required optical series is diminished resulting in a blurred or fuzzy display.

By having a matrix of X by Y leads, a total of XY cells may be addressed using only X+Y leads. By way of example then, a 10×10 matrix needs only 10+10 or 20 leads, but may address 100 electro-optic cells.

The use of three substrates, as discussed above, may be optimum but it is not controlling upon the invention. Two independent cells may be connected to each other to produce the identical result. In this method then, four substrates are used, two for each cell. Apparent from this is that the actual number of substrates used in the invention is open to selection by the designer.

Figure 5:
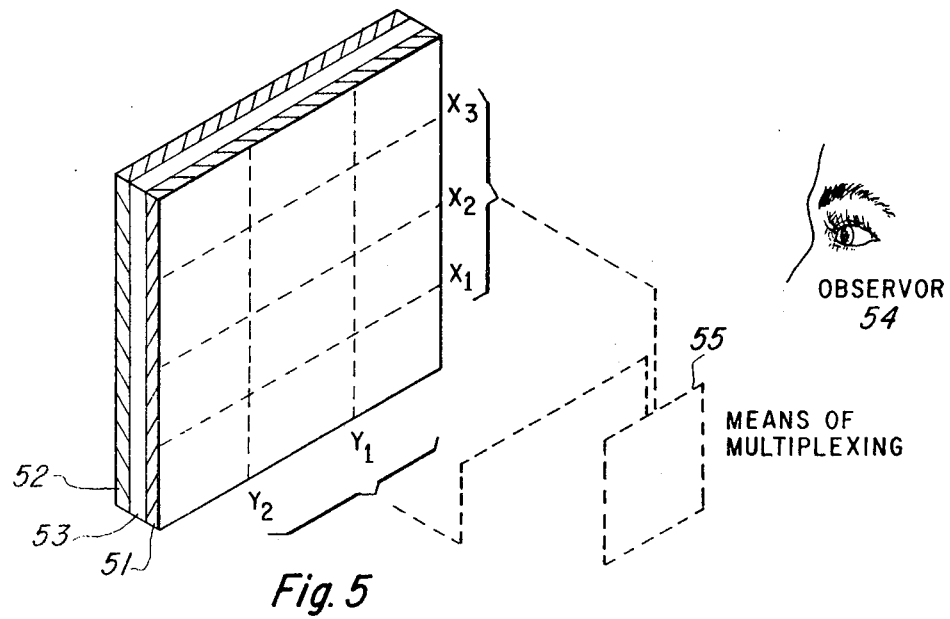
FIG. 5 is a pictorial representation of the invention in operation.

FIG. 5 illustrates the completed invention as described in FIG. 4 in operation. Again, three substrates are used, outer substrate 52, outer substrate 51 and inner substrate 53. Note again that the use of three substrates is not critical to the invention which may have multiple substrates including four. The electrodes on these three substrates form the matrix having $X_1$, $X_2$, and $X_3$ as one axis while $Y_1$, and $Y_2$ form the second axis. Means for multiplexing 55 may be coupled to these electrodes to provide sigals to them using multiplexing techniques known in the art. Observor 54, through this invention, is provided a higher contrast ratio and improved visual display.

What is claimed is:

1. A matrix of liquid crystal cells comprising:
   (a) A center substrate having a first and opposite second surface, said first surface having a plurality of first surface electrodes connected to a plurality of second surface electrodes contained on said second surface and aligned to the first surface electrodes, said center substrate comprising polarizing material;
   (b) a quantity of first liquid crystal material maintained on said first surface of said center substrate;
   (c) a first substrate having a first surface containing a plurality of electrodes, said first surface of said first substrate disposed to enclose the first liquid crystal material between the center substrate and the first substrate;
   (d) a quantity of second liquid crystal material maintained on said second surface of said center substrate;
   (e) a second substrate having a first surface and opposite second surface, said first surface containing a plurality of electrodes, said first surface of said second substrate disposed to enclose the second liquid crystal material between the center substrate and the second substrate, and disposed so that each of the electrodes on the first substrate is aligned to an aligned electrode in the plurality of electrodes on the second substrate;

(f) means for sealing applied around the perimeter of said center substrate applied so that the first substrate is sealed to the center substrate and the second substrate is sealed to the center substrate; and, (g) means for electrically connecting each electrode on said first substrate to the aligned electrode on said second substrate.

2. A matrix of liquid crystal cells as claimed in claim 1 further comprised of a means for multiplexing connected to each of the electrodes on said first substrate and to each of the electrodes on the first surface of said center substrate.

3. A matrix of liquid crystal cells as claimed in claim 1 or 2 further comprised of a means for reflection disposed to said second surface of the second substrate so that light impinging on said means for reflection is reflected back through the second substrate.

4. A graphic display comprising:
first and second matrices of LCD cells; each said matrix of LCD cells comprising:
a plurality of liquid crystal cells, said cells being arranged in rows and columns;
a plurality of row conductors, each of said row conductors being connected to all of said cells in a corresponding one of said rows of said respective matrix;
a plurality of column conductors, each of said column conductors being connected to all of said cells in a corresponding one of said columns of said respective matrix;
said first and second matrices being parallel and closely adjacent, and respective rows and columns of said cells of said first one of said matrices being parallel to and adjacent to corresponding ones of said rows and columns of said second matrix;
polarizing means interposed between said respective first and second matrices;
means for driving corresponding row conductors of said first and second matrices in mutual synchrony; and
means for driving corresponding column conductors of said first and second matrices in mutual synchrony.

* * * * *